Feb. 23, 1960

H. F. HAGEN ET AL 2,925,723

TURBO-REFRIGERATION DEVICE

Filed March 31, 1955

3 Sheets-Sheet 1

INVENTORS
HAROLD F. HAGEN,
BY WILLIAM F. HAGEN

Ooms, McDougall, Williams
& Hersh  Attorneys

Feb. 23, 1960 H. F. HAGEN ET AL 2,925,723
TURBO-REFRIGERATION DEVICE
Filed March 31, 1955 3 Sheets-Sheet 2

INVENTORS
HAROLD F. HAGEN,
BY WILLIAM F. HAGEN
Ooms, McDougall, Williams
& Hersh Attorneys Feb. 23, 1960     H. F. HAGEN ET AL     2,925,723
TURBO-REFRIGERATION DEVICE
Filed March 31, 1955     3 Sheets-Sheet 3

INVENTORS
HAROLD F. HAGEN,
WILLIAM F. HAGEN
BY
Ooms, McDougall, Williams
& Kersh    Attorneys United States Patent Office 2,925,723
Patented Feb. 23, 1960

2,925,723

TURBO-REFRIGERATION DEVICE

Harold F. Hagen, Wilmette, and William F. Hagen, Northbrook, Ill., assignors to The Union Stock Yard and Transit Company of Chicago, Chicago, Ill., a corporation of Illinois Application March 31, 1955, Serial No. 498,196

4 Claims. (Cl. 62—402)

This invention relates to apparatus for use in the chilling and refrigeration of perishable products such as food products and horticultural products. More particularly, it relates to refrigeration and chilling equipment of the type described for use in the practice of the invention described and claimed in the copending application Serial No. 402,071, filed January 18, 1954, now Patent No. 2,705,678.

It is an object of this invention to produce a system for the refrigeration of meat and other perishable food and agricultural and horticultural products in accordance with the teaching of the aforementioned copending application.

Another object of this invention is to produce refrigeration and chilling equipment of the type described which provides for rapid reduction in the temperature of such food products with minimum loss of natural moisture from the food or horticultural products thereby to provide a refrigerated product in which the natural flavors and juices are more fully retained and in which the weight loss during the chilling and refrigerating cycle is greatly reduced by comparison with processes of the type heretofore employed.

A further object is to produce a system of the type described in which the capacity of the cooler or refrigerated space is greatly increased, and in which the output of chilled product per unit space of the cooler is also increased. It is a related object to produce a refrigeration unit of the type described which can be located for operation within the space to be refrigerated without decreasing the space available in the cooler for the refrigeration of products and without interfering with the means for unloading or loading the space or the arrangement of products within the refrigerated space.

These and other objects and advantages of this invention will hereinafter appear, and, for purposes of illustration, but not of limitation, an embodiment of the invention is shown in the accompanying drawings in which—

Figure 1:
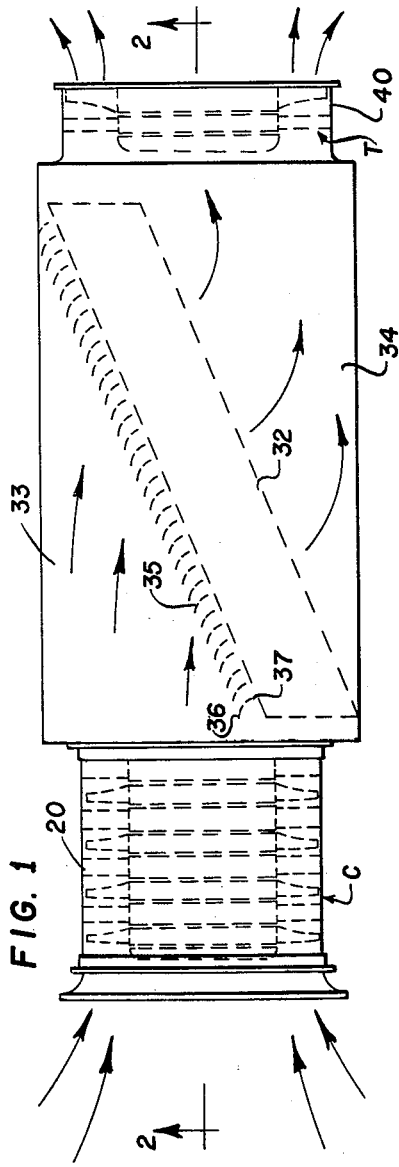
Figure 2:
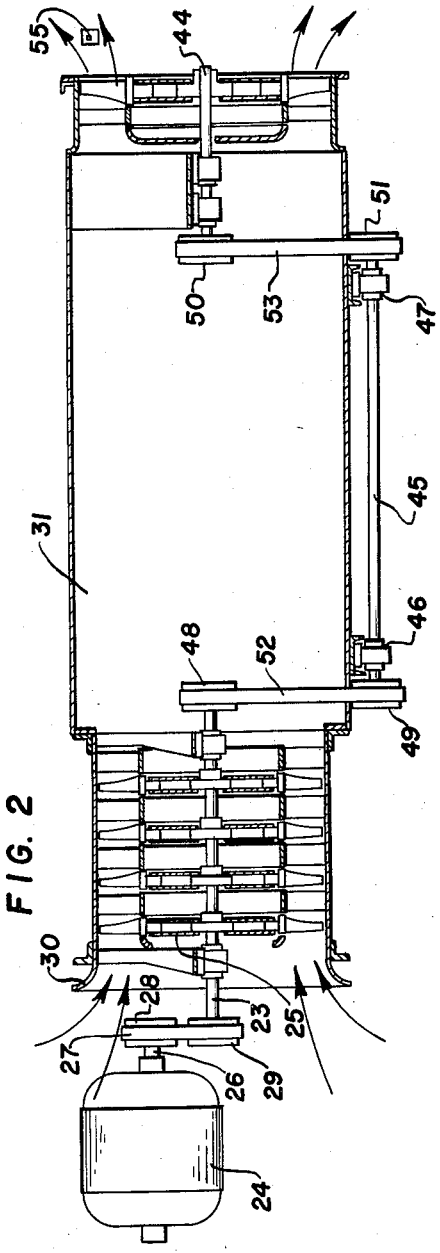
Figure 3:
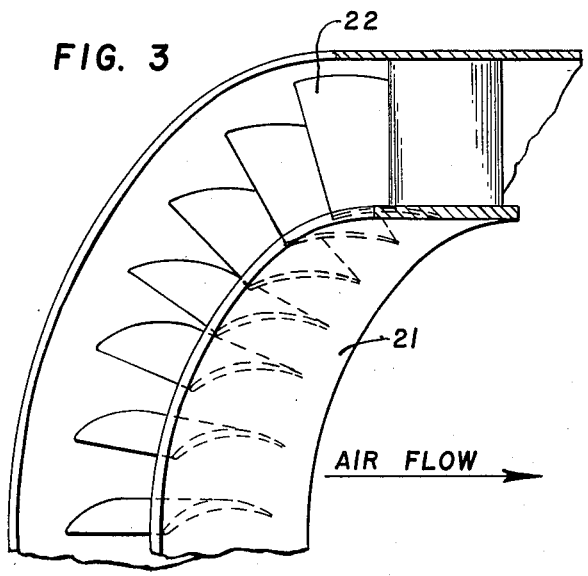
Figure 4:
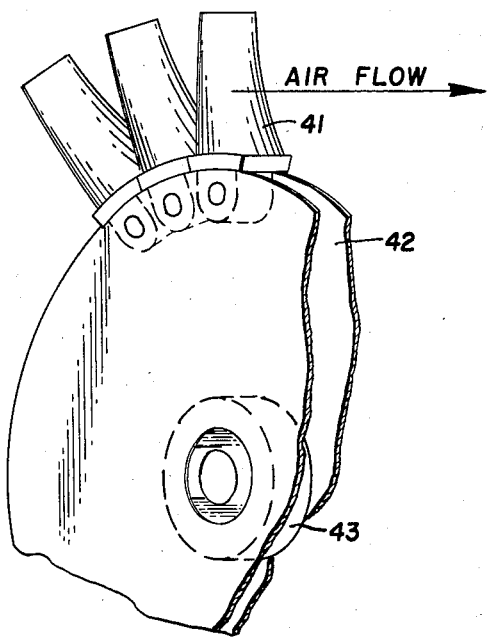
Figure 5:
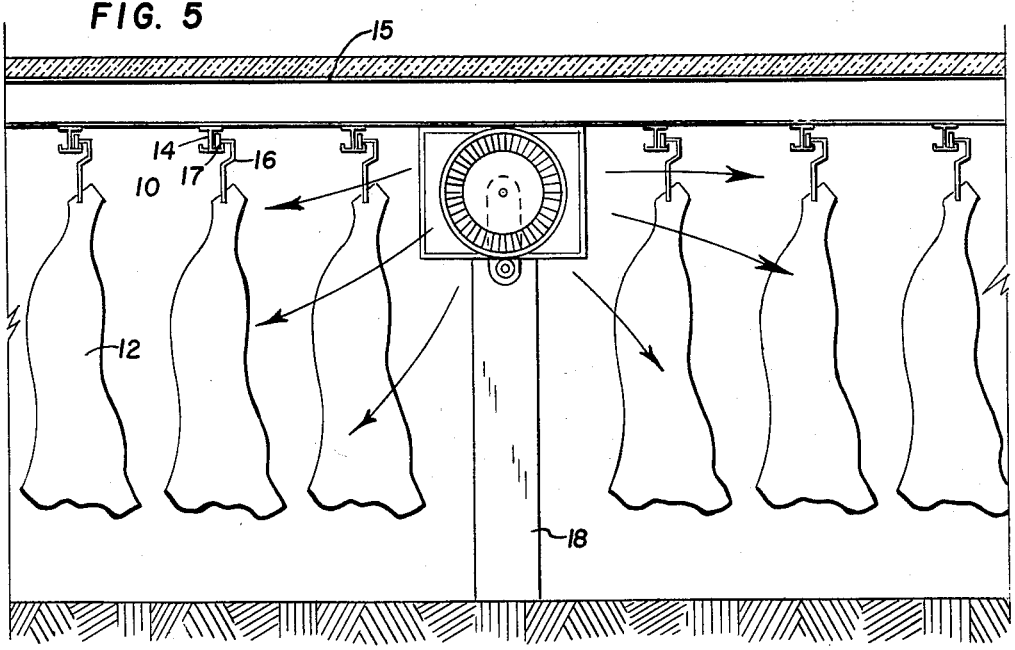
Figure 6:
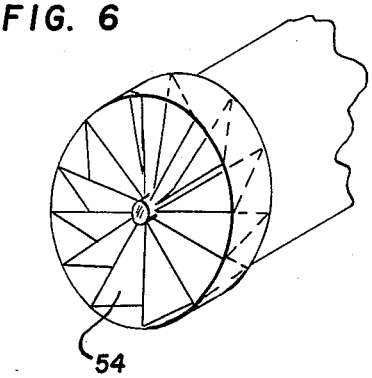

Figure 1 is a plan view of the turbo-refrigeration device embodying features of this invention; Figure 2 is a sectional elevational view taken along the line 2—2 of Figure 1; Figure 3 is a perspective view partially in section of a portion of the fan unit embodied in the practice of this invention; Figure 4 is a perspective elevational view of a portion of the compressor or fan employed in the practice of this invention; Figure 5 is a schematic elevational view of a section of the refrigerated space in which the refrigeration unit of Figure 1 is mounted in position of use, and Figure 6 is a perspective view of the inlet portion of the fan section of the unit shown in Figure 1.

In accordance with the teaching of the aforementioned copending application, a process is provided for the chilling of freshly chilled meat carcasses, for example, by the rapid movement of refrigerated air in a supersaturated state through the refrigerated space for most efficient removal of heat from the carcasses of meat with considerably less desiccation of the meat carcasses than has heretofore been experienced with conventional meat cooling systems such as of the brine spray type.

Because the refrigerated air introduced for circulation through the refrigerated space has the maximum amount of vapor which it is capable of holding, the refrigerated air within the refrigerated space can be moved about the beef carcasses at a maximum velocity without risk of surface burns or freezing, and without extraction of excessive amounts of natural moisture and juices from the carcasses so that the meat retains its natural bloom and flavor and the loss in weight by the evaporation of moisture is reduced from about two to three percent by weight for the brine process to about .75 to 1.4 percent by weight when employing the system described and claimed herein.

Because the super-saturated, refrigerated air is moved about the beef carcasses at high velocity, heat transferred from the carcasses to the air is more rapid with the result that the carcasses can be reduced down to a safe temperature of about 48° F. within twenty-four hours without any surface freezing or burns, as distinguished from the considerably greater length of time required for processes heretofore employed. Such increase in the rate of cooling which is permitted by the use of air incapable of taking on moisture is achieved with less loss in weight by evaporation of moisture from the carcasses and with improved appearance and condition of the meat. In fact, the very rapid movement of the super-saturated cold air about the carcasses for chilling permits closer spacing of the carcasses in the cooler, thereby to increase the capacity of the cooler by as much as twenty percent as compared to the capacity of the same cooler using a brine spray system.

Referring now to the drawings, illustration is made of a fully automatic system for chilling hot carcasses of beef and the like meat products. It will be understood that the same system may be used for holding a cooler with equivalent savings from the standpoint of moisture loss and quality and that it can be used for other meat and for other perishable products, such as vegetables, flowers, and the like, with proper adjustment of the temperature limitations for chilling and for holding in a cold or cooled atmosphere.

In accordance with the practice of this invention, a refrigerated space 10 containing sides of beef 12 or other perishable products is maintained at a predetermined refrigeration temperature by the circulation of air introduced into the chamber in a cold, supersaturated condition wherein the amount of supersaturation in the form of moisture vapor or the equivalent thereof is sufficient to prevent reduction to below saturation at the temperature conditions existing within the chamber during passage of the air through the chamber.

To provide cold air in a supersaturated condition to the refrigerated space 10, the air within the space is recirculated and, during recirculation, it is subjected to successive compression, cooling, and expansion steps. In the compression stage, the air is withdrawn from the refrigerated space at or near a saturated state, and is compressed to about 0.5–3.0 pounds per square inch, usually to about 1 pound or 28 inches of water, as by means of a multiple-stage compression fan, which will hereinafter be described, or by other suitable means. The work performed on the air during compression generates heat which causes the temperature of the compressed air to rise as much as 5 to 20° F. over and above the air entering the compression stage. The amount of temperature rise depends upon the amount of compression and the work done in the compression stage so that the air issuing from the compression chamber may have from 5 to 20 degrees of unsaturation, defined as the amount of moisture in vapor form in the compressed air which would be sufficient fully to saturate the air at a temperature of X degrees lower.

The compressed and unsaturated air is advanced from the compression stage to a cooling stage in the form of a heat exchanger through which a refrigerant liquid or gas is circulated in amounts to maintain the cooling coils at a temperature sufficient to extract the desired amount of heat from the air to provide for a constant delivery temperature in the air issuing from the expansion turbine. The amount of refrigerant and the temperature of the refrigerant circulated through the coils of the heat exchanger is maintained, in normal practice in what will hereinafter be referred to as the "steady state," at a temperature such that the temperature of the external surfaces of the heat exchanger is below the temperature of the compressed air issuing from the multiple-stage fans in the compressor section but which is preferably equal to or above the temperature of the air entering the compression stage thereby to extract heat of compression or part thereof and reduce the temperature of the compressed air without separation of moisture from the air by condensation in the cooling section.

If the air entering the compression stage is below saturation, the temperature of the cooling coils can be below the temperature of the incoming air by an amount slightly less than the degree of unsaturation thereby to avoid condensation. It will, of course, be understood that during the initial cooling down of the refrigerated space immediately after loading with fresh hot carcasses of beef, some condensation may occur during the initial unsteady state, especially if the relative humidity of the space is high at the start of the cycle. Initially, evaporation operation during the unsteady state is desirable to dry the shroud in which the carcasses are wrapped and to set the surface of the meat.

Since the temperature of the air during passage through the cooling stage is, in general, higher than the temperature of the air entering the compression stage, the amount of moisture in the air during passage through the cooling stage will provide for a higher degree of unsaturation than in the air entering the compression stage, with the result that the moisture originally in the air entering the compression stage will remain in the compressed air issuing from the cooling stage.

From the cooling stage, where the compressed air is, for all practical purposes, considered to be saturated or within a few degrees of saturation with water vapor, the cooled and compressed air is advanced to turbines for expansion to normal atmospheric pressure while doing work in driving the turbine blades whereby the air cools upon expansion by an amount depending on the extent to which the air has been compressed. Under normally preferred and practical conditions wherein compression of from 15 to 30 inches of water is possible, the air will be reduced in temperature upon expansion by about 3 to 10° F. Upon cooling by expansion while doing work, the water vapor originally present in the air remains in substantially vaporous form in what will hereinafter be described as a metastable state, except for such small amounts as may precipitate upon dust particles or other nuclei floating in the air or may form into microscopic particles of moisture which are equivalent to the existence of moisture in vapor form. Since the amount of moisture vapor present in the air prior to expansion was at or within a few degrees of saturation, the amount of moisture vapor which remains in the air reduced in temperature, as by 3 to 10° F., will be in excess of that capable of being retained in the air under saturated conditions and will be hereinafter referred to as having X degrees of supersaturation, that is, the amount of water in vapor form contained in the air which would be sufficient for saturation at a temperature X degrees higher.

By refrigeration with air issuing in a supersaturated state from the expansion turbine for introduction directly into the refrigerated space 10, evaporation of moisture from the surfaces of the carcasses 12, or from other perishable products, is substantially completely avoided thereby to reduce any loss in weight in the meat product during the chilling and refrigeration cycle. Because of the existence of the air in a supersaturated condition, it is possible for the first time to move the air at high velocity past the meat or other products and thereby to minimize the thickness of the static layer of air insulating the meat with the result that the rate of heat transfer from the meat is greatly accelerated without increased loss in weight by desiccation. In the past, rapid movement of air past the meat was undesirable because the rate of desiccation was increased by amounts incapable of compensating for the more rapid rate of cooling. Thus, refrigeration with supersaturated air greatly accelerates the rate of heat transfer from the meat products, as well as other perishable products, without excessive desiccation markedly to reduce the length of the chilling cycle and thereby not only to reduce the time available for loss in weight, but also to increase the turn-over for more efficient use of the refrigerated space.

In practice, it has been found that when the supersaturated air issuing from the expansion turbine engages an obstruction while traveling at high velocity, the metastable state is upset with consequent separation of excess vapor as moisture that collects on the surface or remains suspended in the air as free particles of water. In order to avoid condensation of moisture from the supersaturated cold air issuing from the expansion turbine, it is desirable to avoid duct work and to communicate the outlet from the expansion turbine directly with the refrigerated space and preferably to locate the refrigeration machine wholly within the refrigerated space.

In the system described in the aforementioned copending application, the refrigeration unit is located in a chamber completely separate and apart from the refrigerated space, and on another floor above the refrigerated space with an opening between the upper and lower chambers along the side walls thereof for circulation of the cold air downwardly into the refrigerated space below while air is being extracted from the central portion of the lower chamber through an opening at the top in communication with the compression fans of the refrigeration machine.

For best operation, it is desirable to mount the refrigeration unit directly in the refrigerated space to achieve positive circulation of the cold, supersaturated air therethrough, but it is undesirable to sacrifice meat storage space or to interfere with the means by which the carcasses of meat are moved into and out of the storage space.

Thus it is an object of this invention to provide a refrigeration unit of the type described which may be mounted within the space available in the refrigerated room without sacrifice of meat storage space and without interfering with the systems for moving the carcasses of meat into and out of the space.

As illustrated in the drawing, most chill rooms 10 are formed with a plurality of rails 14 suspended from the ceiling 15 of the room and extending lengthwise across the room in closely spaced parallel relation, as illustrated in Fig. 5. The carcasses 12 are suspended from the rails by hangers 16 having rollers 17 on the upper ends thereof which ride in the groove formed in the bottom walls of the rails for rolling the carcasses into and out of the room.

In most of the large number of chill rooms now in use, the refrigerated space is of such dimension that it is necessary to make use of a plurality of vertically disposed center posts 18 for support. Such posts are usually aligned between rails which are spaced apart sufficiently to avoid interference between the posts 18 and the carcasses 12 moved into and out of the room on the adjacent rails. Thus, some space is available between the rails aligned alongside the center posts, but the spaced relation between the posts has been insufficient to permit the use of refrigeration equipment of the type described in the preceding application.

Figs. 1 and 2 illustrate a refrigeration unit embodying the features of this invention for use in the space available in present chill rooms to introduce cold, super-saturated air directly into the room without directing the streams of super-saturated air onto surfaces capable of upsetting the metastable state.

Briefly described, the refrigeration unit comprises an elongate housing having a compression section C in the form of a cylindrical member 20 in which a multiple-stage fan 21 is mounted for rotational movement within the cylindrical housing on a common shaft 23 driven by a driving motor 24. As illustrated in Figs. 2 and 3, each stage of the compression fan is formed with a hub section 25 which supports a cylindrical casing 21 from which a plurality of fan blades 22 extend outwardly in a radial direction in circumferentially spaced-apart relation. It will be understood that instead of making use of a multiple-stage fan of the type described, other types of compression fans may be used for operation within the compression section of the housing.

The driving motor 24 is located outside of the housing and the driving shaft 26 of the motor 24 is operatively connected to the driven shaft 23 of the fan by means of an endless belt 27 interconnecting a pulley 28 on the end of the motor shaft with a pulley 29 on the end of the fan shaft.

The inlet end portion of the compression housing C is flared outwardly, as indicated by the numeral 30, for smoothly channeling the flow of air into the fan section of the housing.

The outlet end of the compression fan section communicates with an intermediate portion 31 of the housing having a bank of cooling coils, indicated by the numeral 32, extending diagonally from the bottom portion adjacent the inlet end to the top portion adjacent the outlet end to divide the cooling section into an upper inlet plenum chamber 33 into which the compressed air is introduced by the multiple-stage compression fans, and a lower outlet plenum chamber 34 which receives the compressed air cooled upon passage through the bank of cooling coils for leading the cooled and compressed air into the expansion turbine T.

While the desired amount of heat extraction in equivalent space could be secured by increasing the surface available for cooling as by increase in the depth of the bank of cooling coils in equipment of the type described in the aforementioned application, such increase in depth to provide the necessary cooling surface would cause an undesirable increase in the resistance to air flow and an undesirable pressure drop across the coils. By the arrangement described, the desired amount of cooling surface is made available with minimum pressure drop across the cooling coils thereby to achieve efficient cooling within the space available for mounting the refrigeration machine within the openings available in the chill room.

One of the difficulties encountered in the use of a diagonally disposed bank of cooling coils resides in the non-uniformities developed in air flow by reason of the fact that the compressed air enters the inlet plenum chamber at a high axial velocity, with the result that the air stream passes over the lower half of the bank of cooling coils and becomes congested in the more limited space at the far end of the inlet plenum chamber, with the result that the air tends to pile through a small proportion of the cooling coils, and the turbulence developed combines with the previously described condition to reduce the efficiency in operation.

In accordance with the practice of this invention, this difficulty is overcome quite effectively by the use of stationary turning vanes 35 extending cross-wise of the housing in longitudinally spaced apart relation. The turning vanes are formed of curvilinear turning blades having their leading edges 36 extending substantially in the direction toward the compression section while the trailing ends 37 extend angularly substantially perpendicularly to the diagonal bank of cooling coils and toward the space between the coils thereby to peel off sections of the air encountered during its travel rearwardly at high velocity from the compression section and turn the peeled-off portions into the underlying section of cooling coils for passage therethrough. By subdividing the air traveling at high velocity through the inlet plenum chamber in the manner described, the air is uniformly divided for passage through the coils whereby most efficient extraction of the heat of compression may be effected with the most efficient arrangement of cooling coils for reducing the pressure drop.

Since the compressed air issues from the under side of the cooling coils into the underlying outlet plenum chamber, turning vanes at the outlet end similar to the vanes at the inlet ends are unnecessary.

The cooled compressed air issuing from the cooling section enters the expansion turbine located within a cylindrical section 40 at the end of the housing wherein the multiple-turbine blades 41 in the form of plastic airfoil members are mounted to extend radially from the blade-supporting hub sections 42 extending outwardly from a ring 43 mounted on a shaft 44. While the fan shaft 23 and the shaft of the expansion turbine are axially aligned, the diagonally disposed bank 32 of cooling coils in the cooling section prevents the use of a common shaft for making use of the power released in the expansion turbine for driving the compression fans. In order to make use of the power released by the turbine, the aligned fan and turbine shafts are interconnected by means of a horizontally disposed shaft 45 mounted adjacent the outer wall of the housing on bearing members 46 and 47 which support the shaft adjacent the end portions thereof for free rotational movement.

The end of the fan shaft 23 is provided with a pulley 48 and the end of the turbine shaft 45 is provided with another pulley 49 aligned with the pulley 48. Similar pulleys 50 and 51 are mounted on the aligned end portions of the expansion turbine shaft 44 and the opposite end portion of the interconnecting shaft 45. An endless belt 52 interconnects pulleys 48 and 49, and another endless belt 53 interconnects the pulleys 50 and 51 so that rotational movement of the turbine shaft 44 is transmitted through the members described to the fan shaft 23 for assisting the motor 24 in driving same.

In the described refrigeration machine, the required amount of refrigeration is greater than that for present systems. The total refrigeration is governed by the temperature drop through the coils, and the amount of air and water vapor handled. If W is the weight of air-water vapor mixture handled per unit of time, the total refrigeration required and the input of the compressor will be proportional to $W(T1-T0)$, and the net refrigeration and the output of the turbine is proportional to $W(T2-T3)$ in which $T1-T0$ is the temperature rise in the compressor and $T2-T3$ is the temperature drop in the turbine. The total amount of refrigeration and net refrigeration is equal to the difference between the input to the compressor and the output of the turbine.

| Compressor input | Turbine output | Total refrig. | Net refrig. |
|---|---|---|---|

$$W(T1-T0) - W(T2-T3) = W(T1-T2) - W(T0-T3)$$

The net horsepower required by the refrigeration machine may also be expressed by the difference between compressor input and turbine output. This net horsepower is the amount that is supplied to the machine by an external power source such as the driving motor 24. While the refrigeration device may be operated at various speeds to provide a wide range of conditions, speed control is not in itself a sufficiently satisfactory method of control. The amount of air-water vapor mixture that is handled will vary proportionally with the speed of operation of the refrigeration device. However, the pressure developed by the compressor will vary as the square of the speed. In other words, if the refrigeration device were operated at one-half speed, the pressure rise in the compressor would be one-quarter of that originally obtained. Thus, by reducing the speed, the degree of super-saturation in the air-water vapor mixture may be reduced.

In practice, it is desirable to maintain as high a degree of super-saturation as is practically possible in order to insure the presence of sufficient moisture vapor in the air to resist desiccation of the perishable products within the chamber. The degree of super-saturation is found to depend greatly upon the temperature drop through the turbine. Since the turbine inlet pressure is essentially equal to the compressor outlet pressure, it has been found more expedient to be able to vary the weight flow of air-water vapor mixture through the machine without changing the compressor ratio developed by the machine.

It has been found that a desired degree of supersaturation may be maintained by reduction in refrigeration loads by providing a constant pressure ratio in the compressor and by reducing the weight flow of air-water vapor mixture through the refrigeration device by the use of controllable spin vanes 54 at the inlet to the compressor fan. The constant degree of supersaturation desired may be achieved further by a combination of inlet spin vanes and by speed control and thereby to provide a degree of supersaturation calculated to be most desirable for the particular product with a minimum expenditure of power and refrigeration.

In the event that it should be desired to achieve a higher degree of supersaturation, it can be secured by the development of higher pressures in the compressor stage. It is also possible to speed up the compressor to obtain higher pressures and close the vanes to reduce the flow to the original or a lesser amount. When the compressor is speeded up, the pressure will rise as the square of the speed, the volume directly as the speed, and the horsepower as the cube of the speed. By the use of inlet spin vane control and by speed control, it is possible to increase the pressure to achieve the desired degree of supersaturation while closing the vanes to maintain constant volume. In so doing, the horsepower rises only as the square of the speed instead of as the cube, thereby to provide for more efficient operation and for desired control of supersaturation.

By way of further improvement, the sensing means for controlling the conditions existing in the cooling section for extraction of heat of compression from the compressed air is located adjacent the outlet from the expansion turbine directly in the path of the cold and supersaturated air issuing therefrom. When the sensing means 55 is located in this position, any variation in the temperature of the air issuing from the expansion turbine into the refrigerated space will be reflected almost immediately in the refrigerant circulated to the cooling coils. Control reflected by sensing means in the form of a thermostat 55 located in the path of the air stream issuing from the expansion turbine may be affected by increase or decrease of the temperature of the refrigerant circulated to the bank of cooling coils, as described in the aforementioned copending application, or by change in the quantity of refrigerant circulated to the coils, as by means of a back pressure regulator valve.

Such sensing means may be considered indirectly to control the temperature conditions existing in the cooling section as distinguished from such direct means as mounting a thermostat in surface contact with the walls of the bank of coolers through which refrigerant is circulated. It has been found that such direct sensing means are dulled because of location interferences, because the velocity of air over the bank of cooling coils is relatively slow by comparison with the velocity of cold and super-saturated air issuing from the expansion turbine, and because of the lag between the device giving the temperature in the room and the actual change.

When the conditions are controlled by the air at the inlet to the compression fans, the sensitivity is again dulled because of the lower velocity of the air and location of the sensing means at the inlet, such as at the throat of the fans, would present a problem of aerodynamic disturbance to the compressors.

The following represents a set of data taken from the operation of the type described for chilling sides of beef delivered from the killing floor at a temperature of about 100° to 103° F. for reduction to a safe temperature of about 48° F. for storage or shipment. From the killing floor, the sides of beef will have a temperature of about 100° F., but the temperature may rise for a short time after the kill to about 103° F., perhaps as the result of enzymatic action which initially takes place. For storage it is desired to reduce the temperature of the meat to below 50° F. and ultimately to about 34° to 38° F. In the following tabulation, the air is raised by the compression fans to a pressure of about 0.75 pound per square inch and the compressed air is reduced again to atmospheric condition during passage through the turbine section for introduction into the cold space.

| Time in Hours | Temp. of Ref. Space in Deg. F. | Temp. of Air into Comp. Fans in Deg. F. | Temp. of Air to Cooling Coils in Deg. F. | Temp. of Air Issuing From Cooling Coils in Deg. F. | Temp. of Cooling Coils | Temp. of Air Issuing From Exp. Turbine | Temp. of Beef at Surface in Deg. F. | Temp. of Beef in the round in Deg. F. |
|---|---|---|---|---|---|---|---|---|
| 0 | 42 | 42 | 55 | 43.6 | 42 | 37 | 86 | 100 |
| 1 | 36 | 38.5 | 51 | 40.1 | 38.5 | 33.5 | 75.5 | 103 |
| 2 | 35 | 37.5 | 50 | 39.1 | 37.5 | 32.5 | 67 | 101 |
| 3 | 33.5 | 36 | 48 | 37.6 | 36 | 31 | 61.5 | 96.5 |
| 4 | 32 | 34.5 | 46 | 36.1 | 34.5 | 29.5 | 54 | 93.5 |
| 5 | 32 | 34.5 | 46 | 36.1 | 34.5 | 29.5 | 51.5 | 90.5 |
| 6 | 31.2 | 33.7 | 45 | 35.3 | 33.7 | 28.7 | 48 | 86 |
| 7 | 31.0 | 33.5 | 44.8 | 35.1 | 33.5 | 28.5 | 46 | 83.5 |
| 8 | 31.0 | 33.5 | 44.8 | 35.1 | 33.5 | 28.5 | 43 | 80 |
| 9 | 31.0 | 33.5 | 44.8 | 35.1 | 33.5 | 28.5 | 40.5 | 75.5 |
| 10 | 31.0 | 33.5 | 44.8 | 35.1 | 33.5 | 28.5 | 38.8 | 73 |
| 11 | 31.0 | 33.5 | 44.8 | 35.1 | 33.5 | 28.5 | 38 | 70 |
| 12 | 31.0 | 33.5 | 44.8 | 35.1 | 33.5 | 28.5 | 37 | 68 |
| 13 | 31.0 | 33.5 | 44.8 | 35.1 | 33.5 | 28.5 | 35.5 | 65.5 |
| 14 | 31.0 | 33.5 | 44.8 | 35.1 | 33.5 | 28.5 | 34.9 | 63 |
| 15 | 31.0 | 33.5 | 44.8 | 35.1 | 33.5 | 28.5 | 34 | 62 |
| 16 | 31.0 | 33.5 | 44.8 | 35.1 | 33.5 | 28.5 | 33.5 | 60 |
| 17 | 31.0 | 33.5 | 44.8 | 35.1 | 33.5 | 28.5 | 33 | 58 |
| 18 | 31.0 | 33.5 | 44.8 | 35.1 | 33.5 | 28.5 | 32 | 57 |
| 19 | 31.0 | 33.5 | 44.8 | 35.1 | 33.5 | 28.5 | 31.8 | 56 |
| 20 | 31.0 | 33.5 | 44.8 | 35.1 | 33.5 | 28.5 | 31.3 | 54.5 |
| 21 | 31.0 | 33.5 | 44.8 | 35.1 | 33.5 | 28.5 | 31.2 | 53.2 |
| 22 | 31.0 | 33.5 | 44.8 | 35.1 | 33.5 | 28.5 | 31.2 | 51.5 |
| 23 | 31.0 | 33.5 | 44.8 | 35.1 | 33.5 | 28.5 | 31.1 | 49.5 |
| 24 | 31.0 | 33.5 | 44.8 | 35.1 | 33.5 | 28.5 | 31.1 | 48 |

It will be apparent from the foregoing that supersaturation in the preferred range of 2 to 10° will be achieved in the air issuing from the expansion turbine after the unit has reached a steady state after the fourth to sixth hour of operation, as set forth in the foregoing tabulation. While the room is cooling down from 42 to about 32° F. during the first four hours of operation, the operation is referred to as in the unsteady state wherein some desiccation of the product sufficient to dry the shroud may immediately take place, and wherein some moisture may condense within the room but usually not within the refrigeration unit. Under an ideal set of conditions, super-saturation in amounts greater than 0.5° will exist in the refrigerated space when air issuing from expansion turbine into the refrigerated space contains 2 to 10° of super-saturation, and is maintained at a temperature of about 32° F.

It will be understood that the temperature conditions for which the machine is set will vary for different products. It will be further understood that changes may be made in the details of construction, arrangement, and operation without departing from the spirit of the invention especially defined in the following claims.

We claim:

1. A chill system for the refrigeration of perishable products comprising in combination a refrigerated space and means for circulating cold and supersaturated air rapidly through the refrigerated space for the extraction of heat from perishable products without extraction of excessive amounts of moisture by vaporization comprising a housing having an inlet at one end and an outlet at the other lying wholly within the refrigerated space, means communicating the refrigerated space with the housing inlet, a compression fan in the housing in communication with the inlet for withdrawing substantially saturated air from within the refrigerated space and compressing the air to a pressure higher than that existing in the refrigerated space with consequent heating up of the air by compression, an expansion turbine in the outlet of the housing for expanding the compressed air back to the pressure within the refrigerated space while doing work whereby the air is reduced in temperature in amounts corresponding to the degree of expansion, and cooling means within the housing intermediate the compression fan and the expansion turbine comprising a bank of cooling coils arranged to extend diagonally across the stream of air issuing from the compression fan, and stationary curvilinear turning vanes extending laterally across the bank of coils in longitudinally spaced apart relation along the side of the bank of coils lying in the path of the air stream with the leading edges of the vanes extending in substantial alignment with the air stream while the trailing edge extends in the direction normal to the bank of cooling coils whereby the turning vanes function to turn the stream of air issuing from the compression fan into the bank of coils.

2. A chill system for the refrigeration of perishable products comprising in combination a refrigerated space and means for circulating cold and super-saturated air rapidly through the refrigerated space for the extraction of heat from perishable products without extraction of excessive amounts of moisture by vaporization comprising a housing having an inlet at one end and an outlet at the other lying wholly within the refrigerated space, means communicating the refrigerated space with the housing inlet, a compression fan in the housing in communication with the inlet for withdrawing substantially saturated air from within the refrigerated space and compressing the air to a pressure higher than that existing in the refrigerated space with consequent heating up of the air by compression, an expansion turbine in the outlet of the housing for expanding the compressed air back to the pressure within the refrigerated space while doing work whereby the air is reduced in temperature in amounts corresponding to the degree of expansion, a chamber within the central portion of the housing in communication at one end with the outlet of the compression fan in communication at the other end with the inlet to the expansion turbine, a bank of cooling coils extending diagonally across said chamber from one end to the other to divide the chamber into an inlet plenum chamber in communication with the compression fan and an outlet plenum chamber in communication with the expansion turbine, and curvilinear turning vanes in the inlet plenum chamber having their leading edges extending in the direction toward the compression fan and their trailing edges extending in the direction toward the broad face of the diagonal bank of cooling coils.

3. A chill system as claimed in claim 2 in which the compression fan and the expansion turbine are mounted on shafts substantially axially aligned and in which means free of the bank of cooling coils operatively interconnects the shaft of the expansion turbine with the shaft of the compression fan for utilization of the power released by the turbine for driving the fan.

4. A chill system for the refrigeration of perishable products comprising a refrigerated space, means for circulating cold and supersaturated air rapidly through the refrigerated space for the extraction of heat from the perishable products without extraction of excessive amounts of moisture by vaporization comprising a housing having an inlet at one end and an outlet lying substantially wholly within the refrigerated space, means communicating the refrigerated space with the housing inlet, a compression fan within the housing in communication with the housing inlet for withdrawing air from within the refrigerated space and compressing the air to a pressure above that existing in the refrigerated space and raising the temperature of the compressed air by heat of compression, an expansion turbine in the outlet of the housing for expanding the compressed air back to the pressure within the refrigerated space while doing work whereby the air is cooled to a lower temperature in proportion to the amount of expansion, cooling means in the form of a bank of cooling coils mounted to extend diagonally through a central portion of the housing between the compression fan and the expansion turbine to divide the area therebetween into an inlet plenum chamber in communication with the compression fan and an outlet plenum chamber in communication with the expansion turbine and including stationary curvilinear turning vanes extending crosswise in longitudinally spaced apart relation in the inlet plenum chamber having their leading edges extending in alignment with the air stream issuing from the compression fan and trailing edges normal to the diagonal bank of cooling coils, means for circulating refrigerant through the cooling coils, and sensing means directly in the path of the cold air issuing from the expansion turbine for control of the refrigerant circulated through the cooling coils to maintain constant temperature conditions in the air issuing from the turbine, and means operatively connected with the sensing means for controlling the refrigerant circulated through the cooling coils to extract sufficient heat from the air from the compression fan to reduce the temperature of the compressed air sufficiently for the reduction in temperature of the air to the desired level upon expansion but above the temperature of the air entering the compression fan whereby the cold air issuing from the turbine will be colder and at a higher humidity level than the air entering the compression fan.

References Cited in the file of this patent

UNITED STATES PATENTS

| | | |
|---|---|---|
| 1,879,685 | Jaczko | Sept. 27, 1932 |
| 2,073,833 | De Bothezat | Mar. 16, 1937 |
| 2,175,469 | Kaufman | Oct. 10, 1939 |
| 2,215,327 | Karsten | Sept. 17, 1940 |
| 2,385,140 | Knowles | Sept. 18, 1945 |
| 2,705,678 | Morrison | Apr. 5, 1955 |